United States Patent
Kicanaoglu et al.

(10) Patent No.: US 10,445,622 B2
(45) Date of Patent: Oct. 15, 2019

(54) LEARNING DISENTANGLED INVARIANT REPRESENTATIONS FOR ONE-SHOT INSTANCE RECOGNITION

(71) Applicant: QUALCOMM Incorporated, San Diego, CA (US)

(72) Inventors: Berkay Kicanaoglu, Amsterdam (NL); Ran Tao, Amsterdam (NL); Arnold Wilhemus Maria Smeulders, Amsterdam (NL)

(73) Assignee: Qualcomm Incorporated, San Diego, CA (US)

(*) Notice: Subject to any disclaimer, the term of this patent is extended or adjusted under 35 U.S.C. 154(b) by 81 days.

(21) Appl. No.: 15/706,541

(22) Filed: Sep. 15, 2017

(65) Prior Publication Data

US 2018/0336434 A1    Nov. 22, 2018

Related U.S. Application Data

(60) Provisional application No. 62/508,277, filed on May 18, 2017.

(51) Int. Cl.
| | |
|---|---|
| *G06K 9/62* | (2006.01) |
| *G06T 7/73* | (2017.01) |
| *G06T 7/564* | (2017.01) |
| *G06T 19/00* | (2011.01) |
| *G06K 9/00* | (2006.01) |
| *G06K 9/46* | (2006.01) |
| *G06F 16/00* | (2019.01) |

(52) U.S. Cl.
CPC ....... *G06K 9/6255* (2013.01); *G06K 9/00624* (2013.01); *G06K 9/4628* (2013.01); *G06K 9/6271* (2013.01); *G06T 7/564* (2017.01); *G06T 7/74* (2017.01); *G06T 19/006* (2013.01); *G06F 16/00* (2019.01); *G06T 2207/10012* (2013.01); *G06T 2207/30236* (2013.01)

(58) Field of Classification Search
None
See application file for complete search history.

(56) References Cited

U.S. PATENT DOCUMENTS

| | | | |
|---|---|---|---|
| 4,658,428 A * | 4/1987 | Bedros | G06T 3/0006 382/216 |
| 8,150,101 B2 | 4/2012 | Haanpaa et al. | |

(Continued)

OTHER PUBLICATIONS

William Lotter, Unsupervised Learning of Visual Structure Using Predictive Generative Networks, Harvard University, arXiv:1511.06380v2, Jan. 20, 2016 (Year: 2016).*

(Continued)

*Primary Examiner* — Mark Roz
(74) *Attorney, Agent, or Firm* — Seyfarth Shaw LLP

(57) ABSTRACT

A method of one-shot joint instance and pose recognition in an artificial neural network includes receiving a first instance of a reference object from a reference image. The reference object has a first identity and a first pose in the first instance. The method also includes generating a first orbit of the reference object comprising additional poses including a second pose for the reference object. The method further includes recognizing a second instance of an example object from an example image. The example object has the first identity and the second pose in the second instance.

26 Claims, 15 Drawing Sheets

(56) References Cited

U.S. PATENT DOCUMENTS

| | | |
|---|---|---|
| 9,111,349 B2 | 8/2015 | Szeliski et al. |
| 9,269,022 B2 | 2/2016 | Rhoads et al. |
| 2006/0269145 A1 | 11/2006 | Roberts |
| 2016/0379083 A1 | 12/2016 | Sala et al. |

OTHER PUBLICATIONS

Koch G., et al., "Siamese Neural Networks for One-shot Image Recognition", 2015, 8 pages.

* cited by examiner

LEARNING DISENTANGLED INVARIANT REPRESENTATIONS FOR ONE-SHOT INSTANCE RECOGNITION

CROSS-REFERENCE TO RELATED APPLICATION

The present application claims the benefit of U.S. Provisional Patent Application No. 62/508,277, filed on May 18, 2017, and titled "LEARNING DISENTANGLED INVARIANT REPRESENTATIONS FOR ONE-SHOT INSTANCE RECOGNITION," the disclosure of which is expressly incorporated by reference herein in its entirety.

BACKGROUND

Field

Certain aspects of the present disclosure generally relate to machine learning and, more particularly, to improving systems and methods of object recognition.

Background

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each has a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

For object recognition systems, it is desirable for the system to recognize all possible appearance variations of the object. Pose recognition may be improved by using a representation that captures intrinsic pose information. An invariant representation that captures the intrinsic identity property of the object provides for robust object recognition systems. Conventional systems may learn representations for identity recognition and pose estimation independently with two different models.

In real-world scenarios, it is often desirable to recognize both the identity of an object and the object's pose (e.g., orientation). For example, in robotics, to interact with objects in an environment, a robot recognizes both the objects in the environment and their respective poses. In this example, for the robot to grab a chair, the robot recognizes the chair and the chair's pose. As another example, in autonomous driving, the autonomous driving may be improved by determining the pose of other cars. In this example, accidents may be avoided by determining whether other cars are coming towards the autonomous vehicle or going away from the autonomous vehicle.

Aspects of the present disclosure are directed to improved methods and systems for determining the pose and identity of an object in an input based on a single image of an object in a reference input without additional sensory information.

SUMMARY

In one aspect of the present disclosure, a method of one-shot joint instance and pose recognition is disclosed. The method includes receiving a first instance of a reference object from a reference image. The reference object has a first identity and a first pose in the first instance. The method also includes generating a first orbit of the reference object including additional poses, such as a second pose for the reference object. The method further includes recognizing a second instance of an example object from an example image. The example object has the first identity and the second pose in the second instance.

Another aspect of the present disclosure is directed to an apparatus including means for receiving a first instance of a reference object from a reference image. The reference object has a first identity and a first pose in the first instance. The apparatus also includes means for generating a first orbit of the reference object including additional poses, such as a second pose for the reference object. The apparatus further includes means for recognizing a second instance of an example object from an example image. The example object has the first identity and the second pose in the second instance.

In another aspect of the present disclosure, a non-transitory computer readable medium with program code recorded thereon is disclosed. The program code for one-shot joint instance and pose recognition in an artificial neural network is executed by a processor and includes program code to receive a first instance of a reference object from a reference image. The reference object has a first identity and a first pose in the first instance. The program code also includes program code to generate a first orbit of the reference object including additional poses, such as a second pose for the reference object. The program code further includes program code to recognize a second instance of an example object from an example image. The example object has the first identity and the second pose in the second instance.

Another aspect of the present disclosure is directed to an artificial neural network for one-shot joint instance and pose recognition, the artificial neural network having a memory unit and one or more processors coupled to the memory unit. The processor(s) is configured to receive a first instance of a reference object from a reference image. The reference object has a first identity and a first pose in the first instance. The processor(s) is also configured to generate a first orbit of the reference object including additional poses, such as a second pose for the reference object. The processor(s) is further configured to recognize a second instance of an example object from an example image. The example object has the first identity and the second pose in the second instance.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
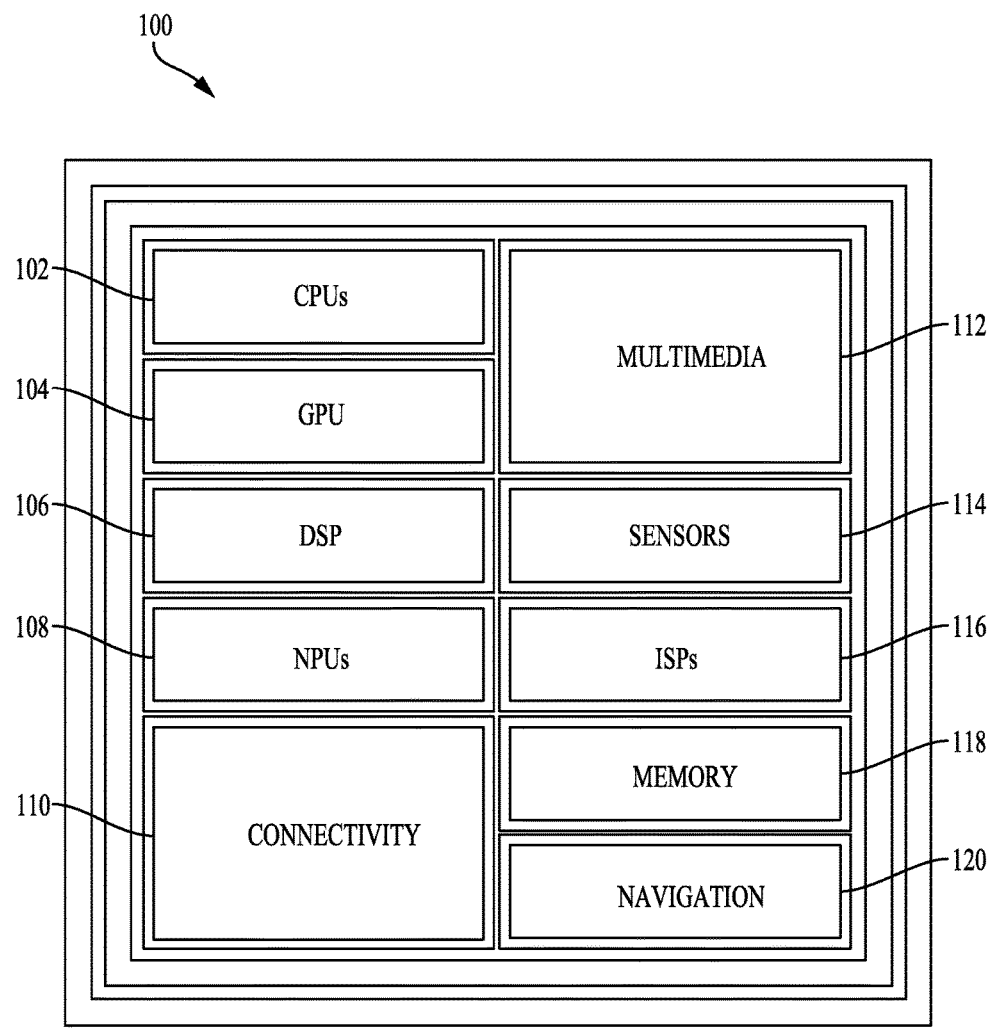
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Learning Disentangled Invariant Representations for One-Shot Instance Recognition It is desirable to improve conventional systems to jointly recognize the identity and pose of a sample (e.g., image) from an input. Joint pose and instance recognition may be used in various systems. For example, an autonomous vehicle may use joint pose and instance recognition to anticipate a direction of another object. The anticipated direction may be used to follow an object, avoid an object, count how many objects are traveling in a specific direction, and/or reveal the intent of an object.

In machine learning, it is desirable to use a single image for various tasks. In some cases, a class of instances is well documented with a variety of samples for each instance in the class (e.g., learning set $\Omega_m$). Furthermore, there may be one or more new instances (e.g., reference set $\Omega_s$), each instance having a single image. Given the one or more instances in the reference set $\Omega_s$, a machine learning system may be tasked with recognizing a sample (e.g., test image) based on the instance(s) in the reference set $\Omega_s$. In some cases, the sample may have a different pose from the pose of the instance(s) in the reference set $\Omega_s$.

Aspects of the present disclosure are directed to jointly recognizing identity and pose for one example image, which may have a different pose compared to the pose of a reference image in the reference set $\Omega_s$. Given the one reference image in the reference set $\Omega_2$, and/or an unknown test image x, multiple images with different poses are hallucinated (e.g., generated). That is, an orbit may be generated with the pose as the varying parameter. In one configuration, the orbit refers to a collection of feature points of an object when submitted to a transformation. The feature points may be ordered by a parameter (e.g., angle) capturing the source of the variation.

In one configuration, feature vectors f are hallucinated to describe each view rather than the view itself. The collection of feature vectors of an object x may be referred to as the orbit $O_x = \{f_j^x | j=1, 2, \ldots, N\}$, where x represents the object (e.g., object identity), j is the index of the elements of the orbit, and N is the total number of elements of the orbit. In one configuration, an orbit generator is learned from the learning set $\Omega_m$. The orbit generator may generate the orbit of an object given a single view (e.g., image) of the object. For example, the orbit generator learns from M instances having the same class (e.g., chair) as the N instances that are to be recognized. In this example, each of the M instances has multiple views. The orbit generator may be modeled by formulating orbit generation as walking on the manifold in the feature space with pose as the varying parameter.

The pose and identity of an object may be recognized in an input based on a single instance of an object in a reference input (e.g., reference image) without additional sensory information. In one configuration, an object recognition system performs joint object identity recognition and pose estimation. The object recognition system of the present disclosure may be trained based on a single training example. That is, in one configuration, the object recognition system learns two representations within a single model that explicitly separates pose information and identity information, and models the interaction of the pose information and the identity information.

According to aspects of the present disclosure, to improve object recognition, an object recognition system extracts identity representations and pose representations by disentangling the identity information of an object from the object's pose. The identity representation is used for object identity recognition and the pose representation is used for pose estimation. In one configuration, one training example is used to train an object recognition system. As a result of using one training example, a speed of training may be increased by training a system (e.g., robot, autonomous vehicle, drone, etc.) to recognize objects and poses. The increased speed of training may allow systems that use object recognition to operate in new environments without additional training time.

FIG. 1 illustrates an example implementation of the aforementioned object recognition system using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a Neural Processing Unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC 100 may be based on an ARM instruction set. In an aspect of the present disclosure, the instructions loaded into the general-purpose processor 102 may comprise code to receive a first instance of a reference object from a reference image, the reference object comprising a first identity and a first pose in the first instance. The instructions loaded into the general-purpose processor 102 may also comprise code to generate a first orbit of the reference object comprising additional poses including a second pose for the reference object. The instructions loaded into the general-purpose processor 102 may further comprise code to recognize a second instance of an example object from an example image. The example object has the first identity and the second pose in the second instance.

Figure 2:
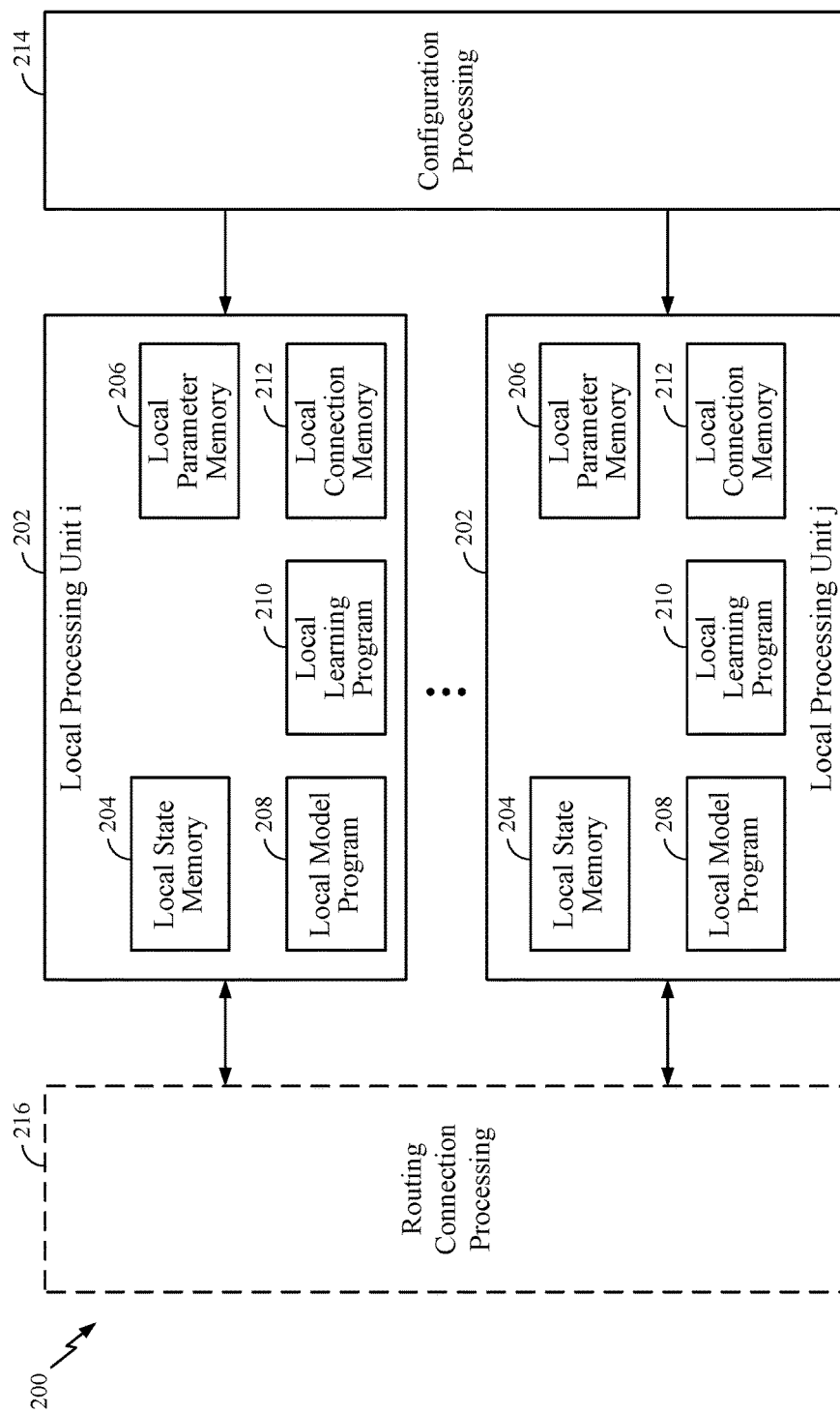
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3:
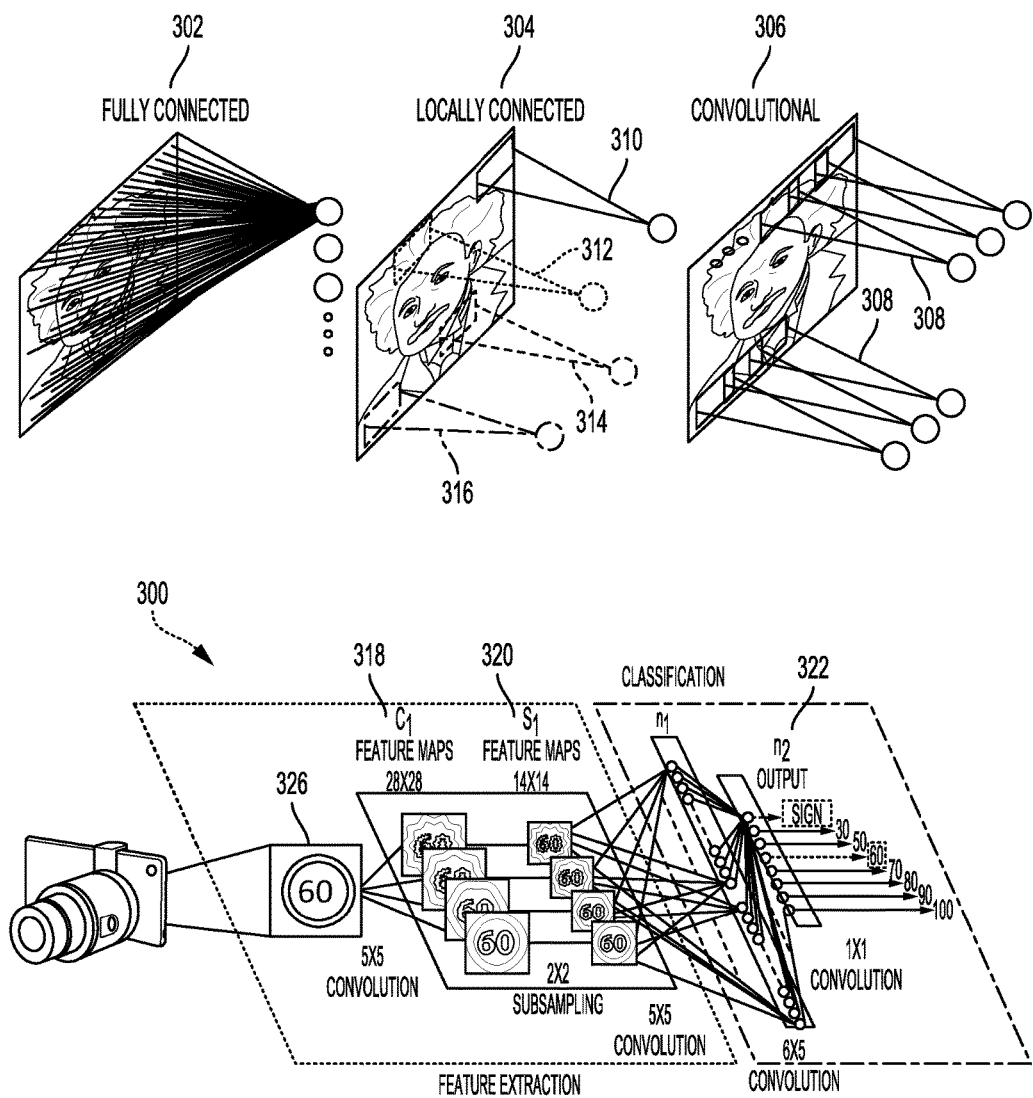
FIG. 3 is a diagram illustrating a neural network in accordance with aspects of the present disclosure.

Referring to FIG. 3, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A DCN may be trained with supervised learning. During training, a DCN may be presented with an image, such as a cropped image of a speed limit sign 326, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 4:
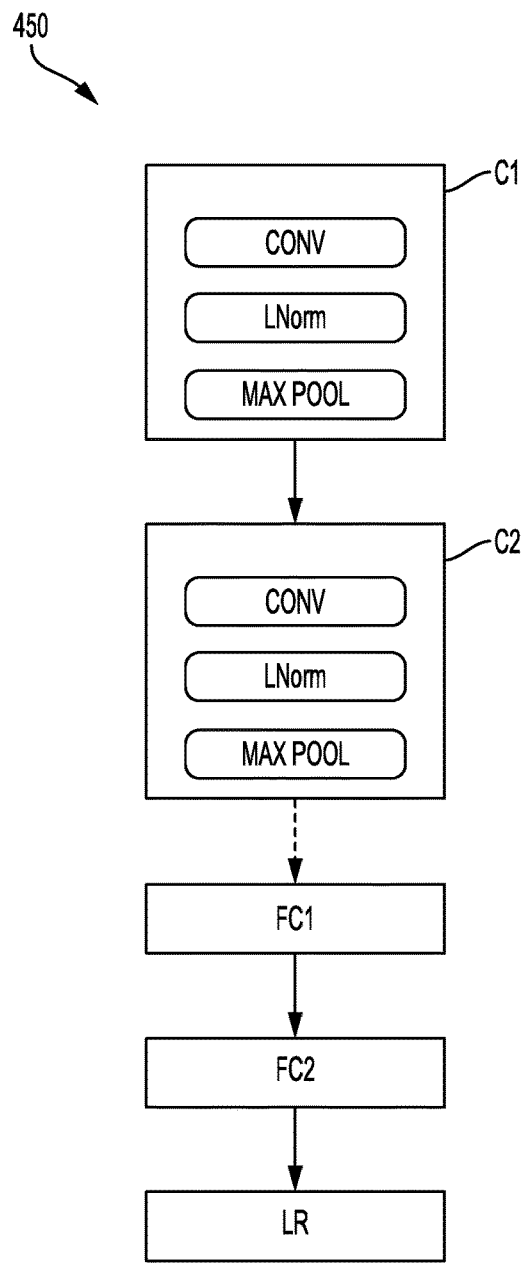
FIG. 4 is a block diagram illustrating an exemplary deep convolutional network (DCN) in accordance with aspects of the present disclosure.

FIG. 4 is a block diagram illustrating an exemplary deep convolutional network 450. The deep convolutional network 450 may include multiple different types of layers based on connectivity and weight sharing. As shown in FIG. 4, the exemplary deep convolutional network 450 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 450 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 450 may also include one or more fully connected layers (e.g., FC1 and FC2). The deep convolutional network 450 may further include a logistic regression (LR) layer. Between each layer of the deep convolutional network 350 are weights (not shown) that are to be updated. The output of each layer may serve as an input of a succeeding layer in the deep convolutional network 450 to learn hierarchical feature representations from input data (e.g., images, audio, video, sensor data and/or other input data) supplied at the first convolution block C1.

In one configuration, a one-shot object recognition model is configured for receiving a first instance of a reference object from a reference image. The one-shot object recognition model is also configured for generating a first orbit of the reference object comprising additional poses including a second pose for the reference object. The one-shot object recognition model is further configured for recognizing a second instance of an example object from an example image. The example object has the first identity and the second pose in the second instance. The model includes a receiving means, generating means, and/or recognizing means. In one aspect, the receiving means, generating means, and/or recognizing means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the model based upon desired one or more functional features of the model, and develop the one or more functional features towards the desired functional features as the determined parameters are further adapted, tuned and updated.

An object recognition system may be tasked with recognizing different instances of an object based on a single instance of the object. In the present application, a single instance refers to one instance of an object in an input (e.g., image) rather than multiple instances of an object in an input. An instance does not refer to an entire image sample. Rather, the instance is one object in the image sample. The single instance of the object in an input may have a pose that is different from the pose of the other instances of the object in other inputs. According to aspects of the present disclosure, an instance refers to a specific object, such as a specific type of car (e.g., Porsche™ 911) or a specific person (e.g., President Obama), and does not refer to all cars in general or all people in general.

In recognition, a set of reference images depicts a set of N instances. For each of the reference images, it is known what instance is in the image. The task is to recognize which of the N instances matches the test image (e.g., example image) when a test image is presented to the system (e.g., artificial neural network). In one configuration, only one reference image is provided in each of the N instances, and it is desired to recognize both the identity and the pose of the test image. Therefore, the problem may be referred to as one-shot joint instance and pose recognition.

For example, given a single-view dataset (e.g., reference set) $\Omega_s$ with $N_s$ object instances that belong to the same category (e.g., car). Each of the $N_s$ instances in the reference set $\Omega_s$ is associated with a single image $x_i$. That is, the reference set $\Omega_s$ is a collection of images $\{x_i | i=1, 2, \ldots, N_s\}$. Each image $x_i$ is associated with an identity label $y_i$ and a pose label $p_i$. Furthermore, $Y_s$ is the set of identity labels and $P_s$ is the set of pose labels in the reference set $\Omega_s$. Given a test image $x_t$, which depicts one of the $N_s$ instances in $\Omega_s$, the artificial neural network is tasked with simultaneously recognizing the test image's $x_t$ identity label $y_t$ ($y_t \in Y_s$) and pose $p_t$. The images $x_i$ in the reference set $\Omega_s$ are reference images, which are used to infer the identity label $y_t$ and the pose label $P_t$ of the test image $x_t$. The reference set $\Omega_s$ includes one image for each instance. Therefore, aspects of the present disclosure perform joint instance and pose recognition based on one image (e.g., one-shot joint instance and pose recognition).

According to aspects of the present disclosure, pose is characterized by one parameter (e.g., viewpoint angle). The viewpoint angle may be continuous. Thus, the pose space may also be continuous. The continuous space is discretized by uniformly sampling pose classes with Δk-degree intervals, resulting in N pose classes, denoted by P. In one configuration, $P_s \subseteq P$ and $P_t \in P$. In practice, images of the same instance may show different poses. Therefore, the test image and the reference image may differ in appearance even though they depict the same instance, thereby increasing the difficulty of instance recognition. Moreover, the images in the reference set $\Omega_s$ may cover a limited repertoire of poses. Thus, the pose of the test image $P_t$ may not be in the set of pose labels $P_s$. For example, the instances $N_s$ of the images in the reference set $\Omega_s$ may show the same pose, (e.g., $|P_s|=1$), while the instance of the test image $x_t$ may be in any pose.

Figure 5:
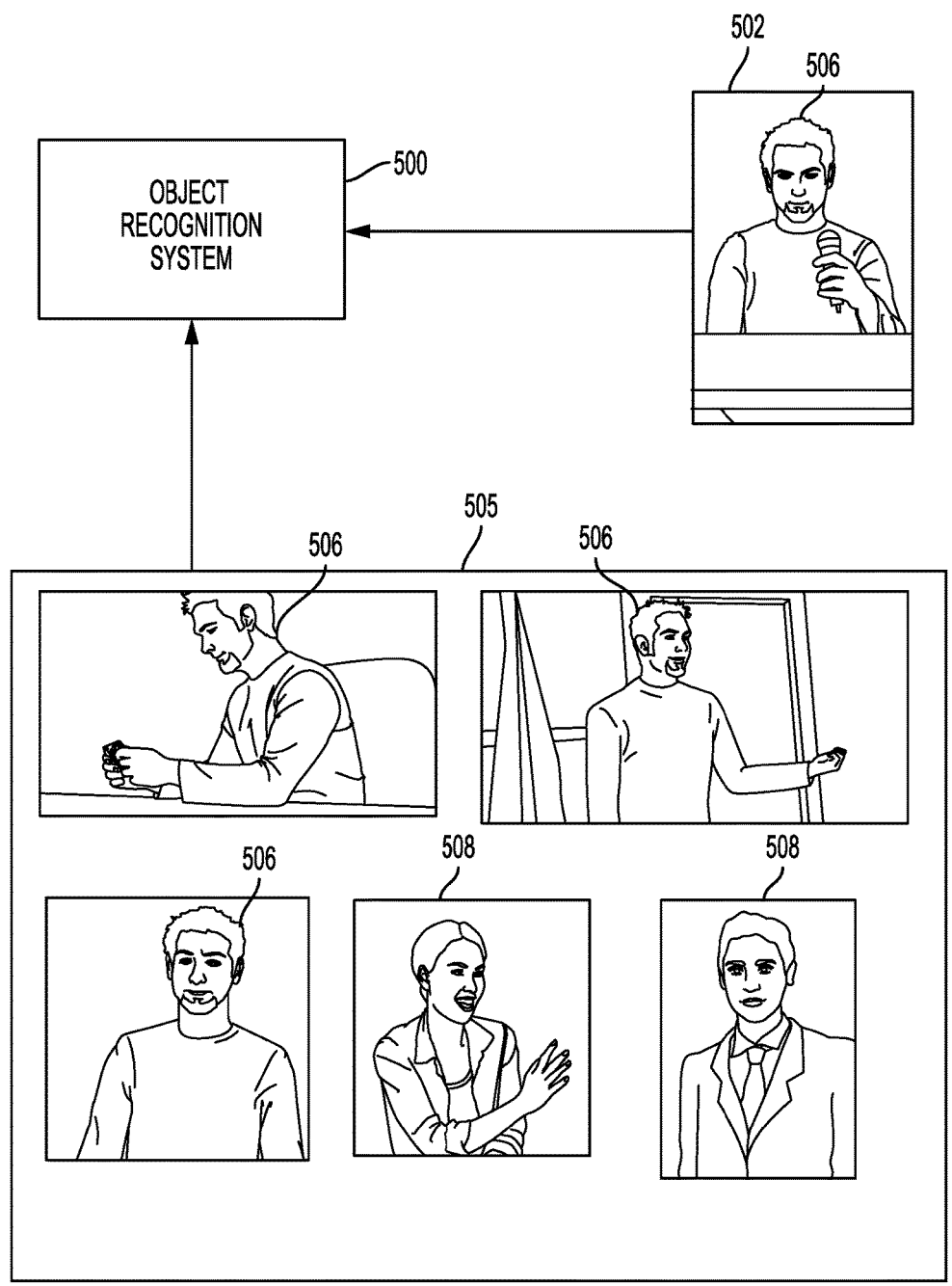
FIG. 5 illustrates an example of object recognition in accordance with aspects of the present disclosure.

As an example, as shown in FIG. 5, an object recognition system 500 may receive a first input 502 (e.g., reference image). Based on the received input, the object recognition system 500 may be tasked to recognize all other instances of an object 506 (e.g., man with a goatee) from a dataset 505 without having seen the different poses of the object. As shown in FIG. 5, the pose (e.g., orientation) of the object 506 in the dataset 505 is different from the pose of the object 506 in the first input 502. Thus, in one configuration, based on the single instance of the object 506 (e.g., man with a goatee facing the camera) in the first input 502, the object recognition system 500 recognizes different instances of the object 506 in different poses (e.g., different poses of the man with a goatee) from multiple different items in the dataset 505. Furthermore, other objects 508 do not have the same identity as the identity of the object in the first input 502. Therefore, the other objects 508 are not recognized as the man with a goatee.

Figure 6:
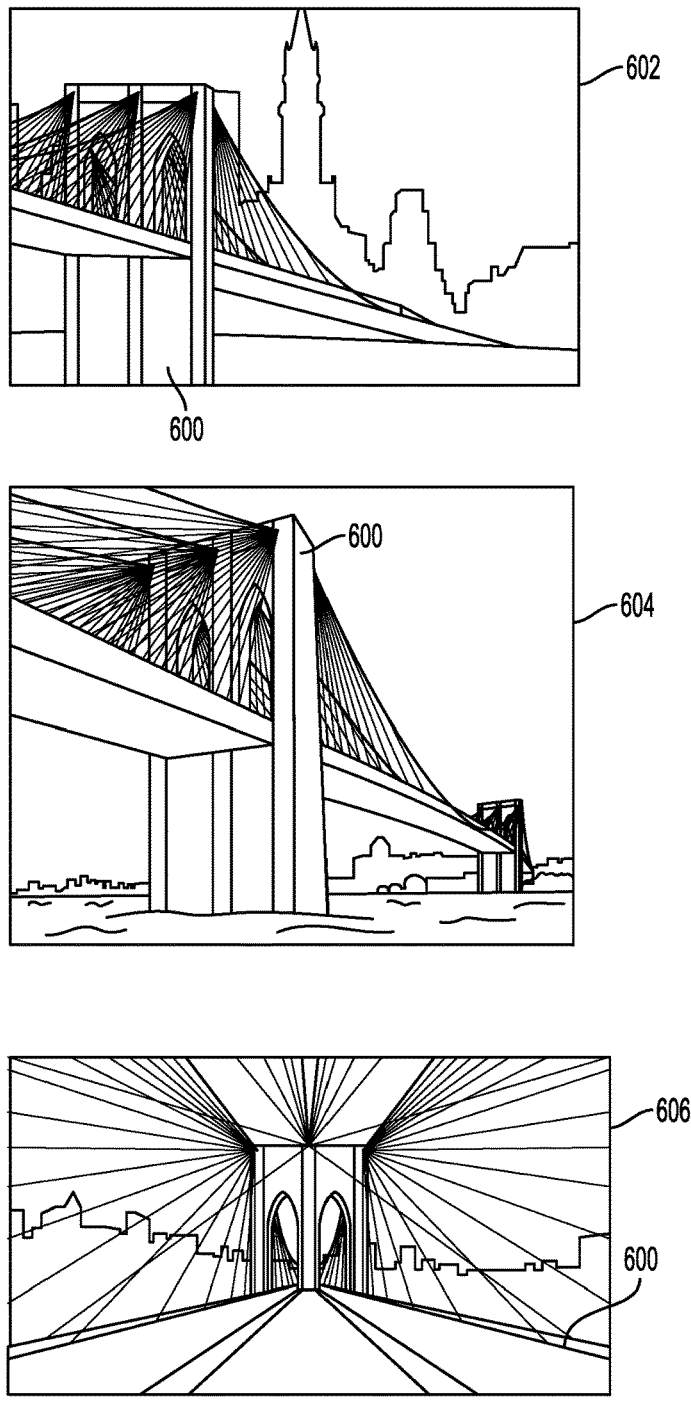
FIG. 6 illustrates examples of different instances of an object in accordance with aspects of the present disclosure.

Visual features of an instance may vary in appearance in different inputs due to different factors, such as changes in illumination, pose, surface cover, self-deformation, occlusion, context, viewpoint, camera factors, and/or other factors. As an example, as shown in FIG. 6, the visual features of a bridge 600 vary in the different images 602-606 based on factors such as illumination, pose, surface cover, self-deformation, occlusion, context, viewpoint, camera factors, and/or other factors. Aspects of the present disclosure are directed to recognizing instances of the bridge 600 in an input based on only a single instance of the bridge 600, such as the instance in image 602. Aspects of the present disclosure are not limited to recognizing instances of only different poses. The object recognition system is also contemplated to find instances with different factors (e.g., visual features) from the instance of the initial query, such as illumination, surface cover, self-deformation, occlusion, context, viewpoint, camera factors, and/or other factors.

Figure 7:
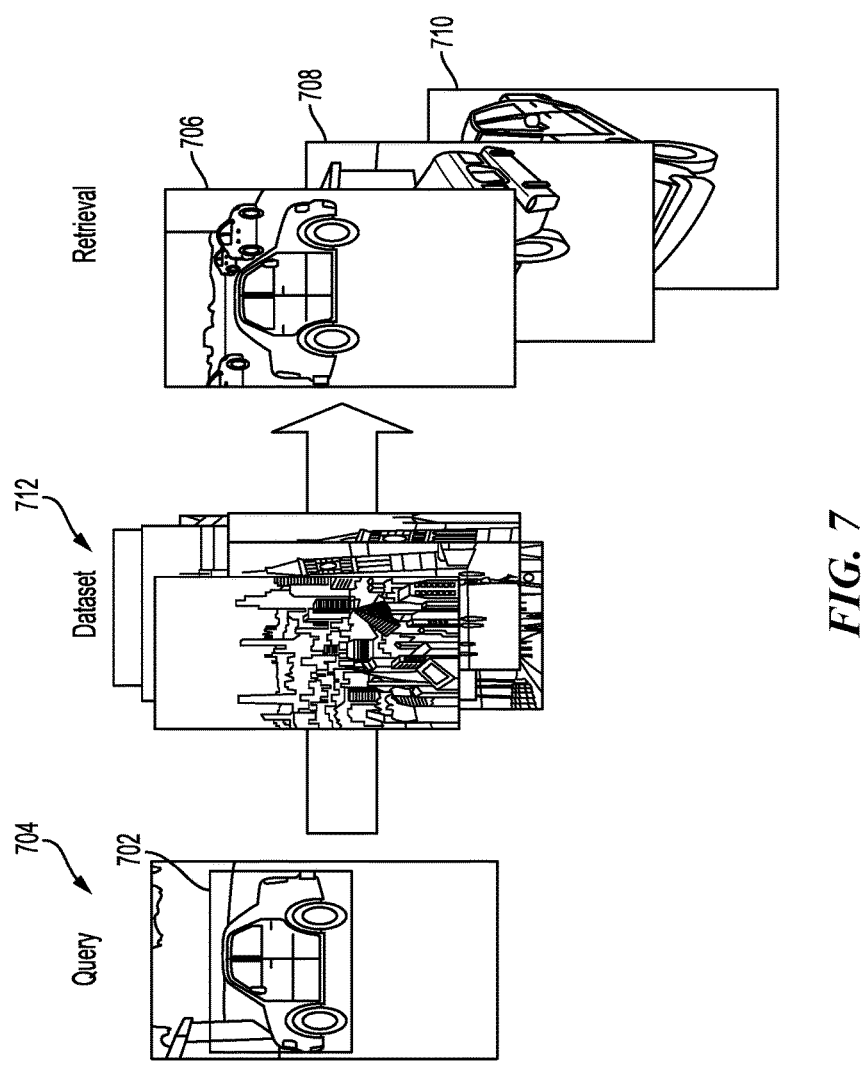
FIGS. 7, 8, 9, and 10 illustrate examples of object recognition in accordance with aspects of the present disclosure.

FIG. 7 illustrates an example of recognizing instances 706-710 of an object 702 in a dataset 712 of different objects based on a received query 704 of the object 702. In the present example, as shown in FIG. 7, an object recognition system (not shown) may receive a query 704 to recognize all instances of the object 702 (e.g., blue four door car) from the dataset 712, which includes images of different objects. In the present example, only a single instance of the object 702 is provided in the query 704. The object recognition system recognizes instances 706-710 of the object 702 and recognizes the different poses based on the single image of the object 702 in the query 704.

Figure 8:
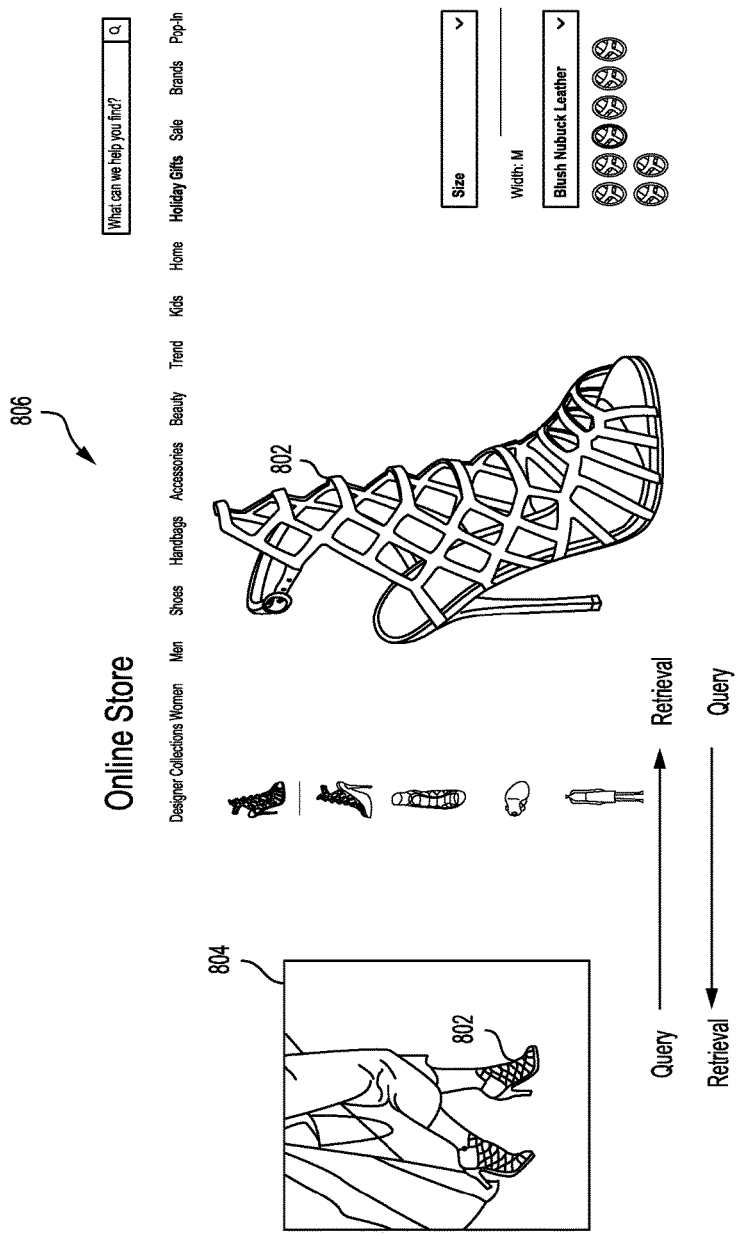

In another example, as shown in FIG. 8, an object recognition system may receive a query that includes an image of an object 802, such as an image of a shoe from an online shopping platform 806. The object recognition system may recognize one or more instances 804 of the object 802, such as an image of a person wearing the respective shoe, from a dataset. Alternatively, the query may include the instance 804 of the object 802 and the object recognition system may recognize instances of the object 802 in an online shopping platform 806. The object recognition system recognizes both the identity of the instance (e.g., shoe) and the pose of the instance based on the reference image in the query.

Figure 9:
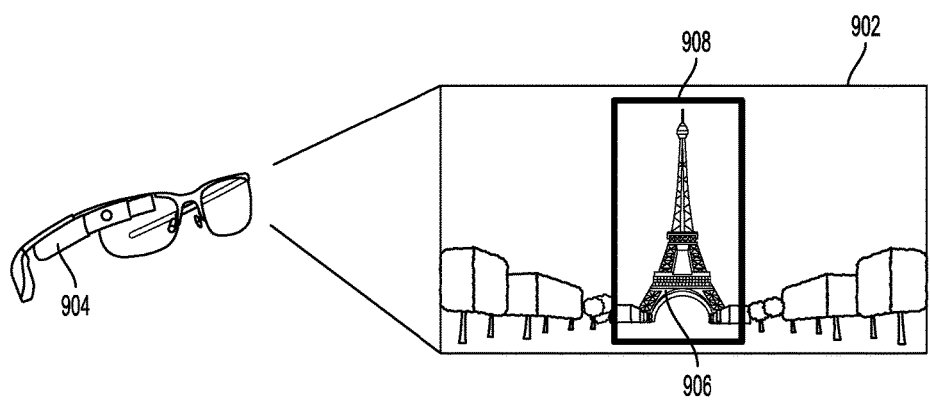

FIG. 9 illustrates another example of visual instances recognition according to aspects of the present disclosure. As shown in FIG. 9, a user may view a scene 902 via an image capturing device 904, such as an optical head-mounted image capturing device. The image capturing device 904 may recognize instances of landmarks 906 (e.g., Eiffel Tower) in the scene 902, augment 908 the landmark 906 (e.g., bounding box), and/or self-localize (e.g., display a location, such as Paris, of the scene).

Figure 10:
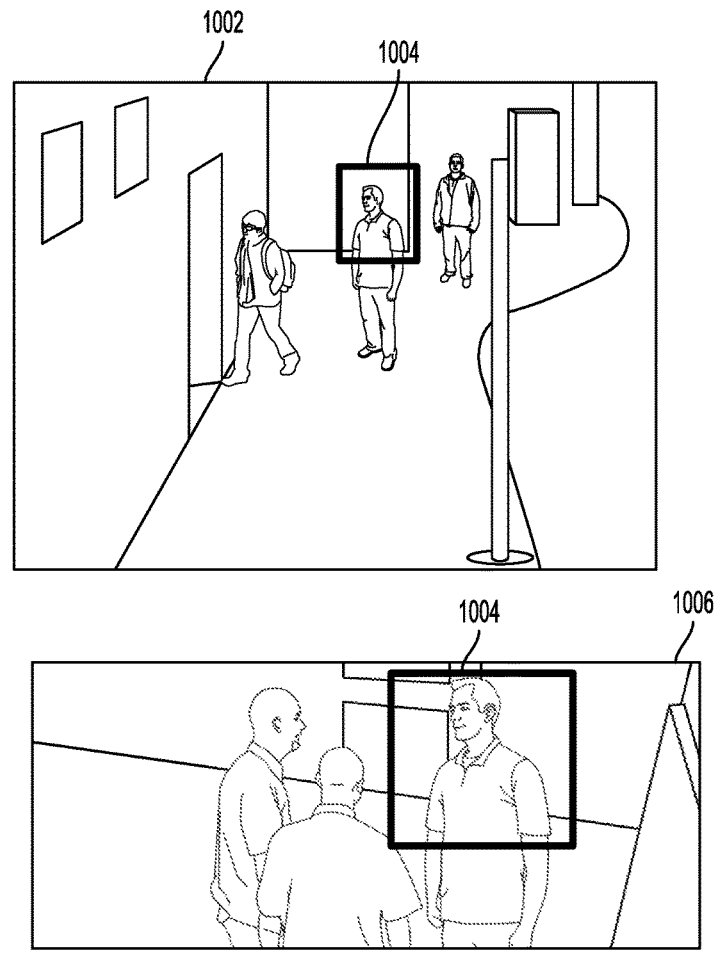

FIG. 10 illustrates another example of visual instances recognition according to aspects of the present disclosure. As shown in FIG. 10, an object recognition system may receive an input 1002 of an instance of an object 1004, such as a suspected criminal, to search for other instances of the object 1004. In this example, the search may be performed to recognize other inputs 1006 of the instance of the object 1004 and also identify the pose and identity of the instance of the object 1004.

One-shot joint instance and pose recognition may be applicable to various scenarios. For example, one-shot joint instance and pose recognition can be used for tracking objects, autonomous following of an object (e.g., following a car), counting on the basis of pose (e.g., counting the number of cars traveling in the same direction), and distinguishing different types of objects (e.g., distinguishing one smartphone brand from another smartphone brand).

In some cases, the identity of the object (e.g., subject) of the query is determined without knowing the pose. In one configuration, the pose of the subject is determined after determining the identity. Determining the pose may assist in collision avoidance. As an example, for autonomous vehicles, irrespective of identity, determining that an object is heading towards the autonomous vehicle may prevent a collision with the object. Determining the pose may also assist in revealing the intent of the object. That is, when the identity of an object, such as a chef, is known, the intent of the object, such as the chef moving towards the stove to cook, may be determined based on the determined pose. As an object has only one identity, knowing the class of the identity reduces the search space of determining the pose, as only poses associated with the determined identity may be recognized.

An orbit of a reference image may be used to recognize a test image. In one configuration, the orbit of an object under a transform G is the collection of all feature points of the object under various instantiations of the transform, G(k), where G is the pose and k is the angle of view. For a continuous transform, the orbit may be a continuous and continuously differentiable function, as each change in the driving parameter results in a change in feature values. There are various conditions in an image that may affect the shape of the orbit. In one example, when the view of the object has no visible details (as expressed in a change of feature values) over a range of the angle of view k, the orbit may stall and temporarily coincides in a point. As another example, when the object includes cavities, the orbit may demonstrate discontinuities in the feature string when a new facet of the object comes into view. As yet another example, when the object is rotationally repetitive in the direction of the viewpoint, and the illumination does not break that symmetry, the orbit may self-intersect. Aspects of the present disclosure may exclude the aforementioned examples that may affect the shape of the orbit. In one configuration, the orbit is continuous, non-self-intersecting and continuously differentiable. As the pose space is discretized uniformly into N pose classes, the orbit becomes a discrete and ordered set of feature points spanning the orbit.

The orbit of an object under pose variation may be defined as $O=\{f(k_i; o_{id})|k_i \in K\}$, where K is the set of angles corresponding to the sampled pose classes, and $f(k_i; o_{id})$ is the representation (e.g., point in the feature space, of object $o_{id}$, under viewpoint angle $k_i$). The cardinality of the orbit is N, $|O|=N$. $f(k1; o_{id})$ represents the one available example. $f(k_{i+1}; o_{id})$ is $\Delta k$-degree rotated over $f(k_i; o_{id})$, and $f(k_{i+t}; o_{id})$ is t $\Delta k$-degree rotated.

Two images $x_i$ and $x_j$ may depict the same object instance. When the orbit generation for each image is ideal, $O_{xi}$ and $O_{xj}$ include the same points and two sets of points are aligned after a δ-step shift, where $\delta \Delta k$ is the angle difference between poses of a first image $x_i$ and a second image $x_j$. In one configuration, an instance recognition function is used for setting the instance label $y_t$ of the test image $x_t$ based on the label of the reference image $x_i$. In this configuration, the instance label $y_t$ of the test image $x_t$ is the label of the reference image $x_i$ in a reference set $\Omega_s$ having an orbit $O_{xi}$ that is closest to the orbit of the test image $Q_{xt}$, expressed by:

$$y_t = \underset{y_t}{\operatorname{argmax}} M(O_{xi}, O_{xt}), \qquad (1)$$

where M is the metric function measuring the similarity of two orbits. M is defined as:

$$M(O_{xi}, O_{xt}) = \max_{\delta=0,1,\ldots N-1} \sum_{j=1}^{N} \langle f_{j+\delta}^{x_i}, f_j^{x_t} \rangle, \qquad (2)$$

$O_{xi}=\{f_j^{x_i}|j=1, 2, \ldots, N\}$ and $O_{xt}=\{f_j^{x_t}|j=1, 2, \ldots, N\}$. +δ refers to a circulant shift by δ steps. The proposed metric function M considers the circulant shifts and takes the maximum assuming that the two orbits will have the highest similarity when they are aligned according to the viewpoint angles. M uses a sequence-to-sequence comparison, considering the sequence of ordered points on an orbit jointly. In this way, M is robust against generation errors made on individual points during orbit generation.

In one configuration, pose recognition is performed after recognizing the instance identity. The instance in the test image may be recognized as $y_t$, with the corresponding reference image $x_i$. The pose label $p_t$ of the instance in image $x_t$ can be determined after obtaining the angle $k_t$ as $$k_t = k_i + \hat{\delta} \cdot \Delta k \qquad (3)$$

where $k_i$ is the viewpoint angle of $x_i$ and $$\hat{\delta} = \max_{\delta=0,1,\ldots N-1} \sum_{j=1}^{N} \langle f_{j+\delta}^{x_i}, f_j^{x_t} \rangle. \qquad (4)$$

Figure 11:
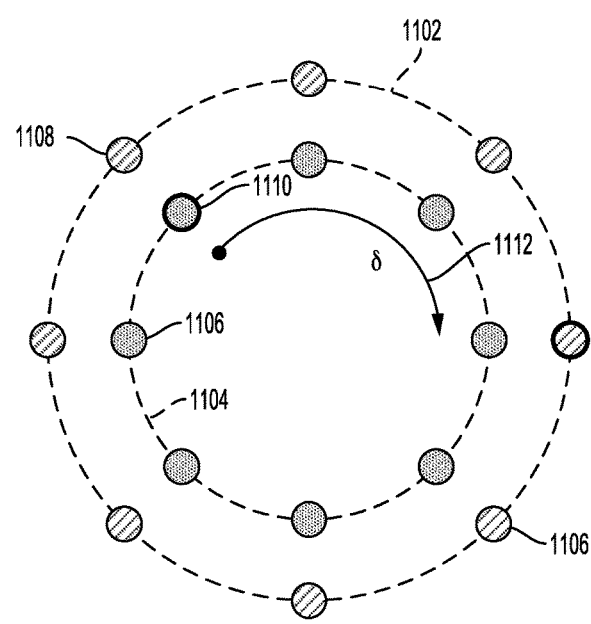
FIG. 11 illustrates an example of orbit comparison according to aspects of the present disclosure.

FIG. 11 illustrates an example of a comparison of two orbits based on aspects of the present disclosure. As shown in FIG. 11, a similarity between two orbits is measured using circulant shifts. The similarity measurements may be referred to as a convolution or correlation between two signals. As previously discussed, M takes the maximum over all the circulant shifts, assuming the similarity is at maximum when the orbits are aligned (e.g., poses are matched). In one configuration, when performing object recognition, an orbit is generated for both the reference image and the test images. The orbits are compared to recognize an instance of the reference image. That is, when the orbits match, the system may recognize that the test image includes an instance of the same object from the reference image. The object may have different poses in the reference and test images.

As shown in FIG. 11, a first orbit 1102 for a test image is compared to a second orbit 1104 for a reference image. The two orbits 1102, 1104 have the same set of points 1106. After a δ-step shift, where $\delta \Delta k$ is the angle difference between poses of $x_i$ and $x_j$, two points 1108, 1110 should be aligned. That is, the second orbit 1104 may be rotated in a direction 1112 to align two points 1108, 1110 on the orbits 1102 1104. In this example, each point 1106 for the first orbit 1102 is a representation $f(k; o_{x_t})$ (e.g., point in the feature space, of object $o_{x_t}$, under viewpoint angle k). Additionally, each point 1106 for the second orbit 1104 is a representation $f(k; o_{x_j})$ (e.g., point in the feature space, of object $o_{x_j}$, under viewpoint angle k). A specific point, such as the first point 1108 of the first orbit 1102 may be a representation $f(k_t; o_{x_t})$, and a second point 1110 of the second orbit 1104 may be a representation $f(k_i; o_{x_j})$.

In one configuration, an orbit generator is taught to generate the orbit of an object under transform G given a single view of the object. A two-branch architecture may be used when the orbit generator is in the learning phase (see FIG. 12). The two branches may be similarly parametrized (e.g., identical). Each branch has an encoder-decoder architecture.

In the present configuration, the encoder receives an image as an input and encodes the image into a latent representation $f_{encoder}$, divided into two parts, identity representation $f_{id}$ and pose information $f_{pose}$. $f_{id}$ captures the identity information of the object $o_{id}$. The orbit generation is formulated as traversing on the manifold with pose as the varying factor. The traversal is achieved in a recurrent and incremental manner, where each step introduces a small local transformation in pose (e.g., 10 degree) shift. The local transformation in each recurrent step is modeled as a linear transformation on the latent pose representation. For example, $f_{pose}^{t} = B f_{pose}^{t-1}$. B is the matrix expressing the local transformation, which will be learned. At each time step t, the decoder concatenates the untouched $f_{id}$ and the pose representation $f_{pose}$, and reconstructs the image with the corresponding pose based on the concatenation.

Orbit generation is improved by disentangling the identity information and the pose information. In one configuration, a unit swap improves the disentanglement of the identity information and the pose information. In this configuration, pose representations are swapped across two branches during sequence generation. That is, the two-branch network receives, as an input, two images showing two different instances (e.g., car1 and car2) in the same pose. The swap causes the network to encode properties that characterize the instances uniquely (e.g., the identity information $o_{id}$) into $f_{id}$ and the common pose information shared by the two images into $f_{pose}$. The two-branch architecture with a unit swap improves the training of the orbit generator. The improved training leads to improved one-shot instance and pose recognition. Note that after training, only one branch generates the orbit of an object given a single image of the object.

The encoder includes multiple convolutional layers. In one configuration, the encoder includes three convolution layers with a 5×5 kernel size and a stride of two followed by activations (e.g., rectified linear unit (ReLU) activations). In this configuration, the feature maps are downsampled by convolution strides. That is, hard-pooling layers may not be used. The convolution-activation blocks are followed by fully-connected layers (e.g., two fully-connected layers) resulting in a representation $f_{encoder}$, such as a 1024 dimensional (1024-d) representation. $f_{encoder}$ may be sliced into pose units and identity units, such as a 512 dimensional (512-d) identity unit $f_{id}$ and 512 dimensional pose unit $f_{pose}$. In one configuration, the decoder is symmetric to the encoder and convolution layers are replaced by deconvolution layers. At each deconvolution-activation block, input feature maps are upsampled by a factor, such as a factor of two. Reconstructions of the images are obtained at the output of the decoder.

The orbit generator may be trained on a multi-view dataset $\Omega_m$ having training object instances $N_m$. The training instances $N_m$ are different from the reference instances $N_s$ where recognition will be conducted. Still, both the training object instances $N_m$ and the reference object instances $N_s$ are from the same category. Each of the training object instances $N_m$ is described by a set of observations, covering the range of variations in view induced by the transform G. For each instance in the multi-view dataset $\Omega_m$, a full orbit may be covered with images at an approximately ten degree interval in pose.

The training may be based on the pixel-wise reconstructions of the images over all time steps:

$$L = \Sigma_{i=1}^{N_b} \Sigma_{t=1}^{T} (\|x_{i,1}^{t} - \text{dec}(\text{cat}(f_{(id,i,1)}, f_{(pose,i,1)}^{t}))\|_2^2 + \|x_{i,2}^{t} - \text{dec}(\text{cat}(f_{(id,i,2)}, f_{(pose,i,2)}^{t}))\|_2^2) \quad (5)$$

$N_b$ is the batch size, T is the length of the sequence to be generated. $x_{i,1}^{t}$ and $x_{i,2}^{t}$ are the ground-truth images to be reconstructed at time step t for the two branches, respectively. dec( ) is the decoder and cat( ) is the concatenator. $f_{(id,i,1)}$ and $f_{(id,i,2)}$ are the identity representations, constant over time. $f_{(pose,i,1)}^{t}$ and $f_{(pose,i,2)}^{t}$ are the pose representation at time step t for the two branches respectively.

Figure 12A:
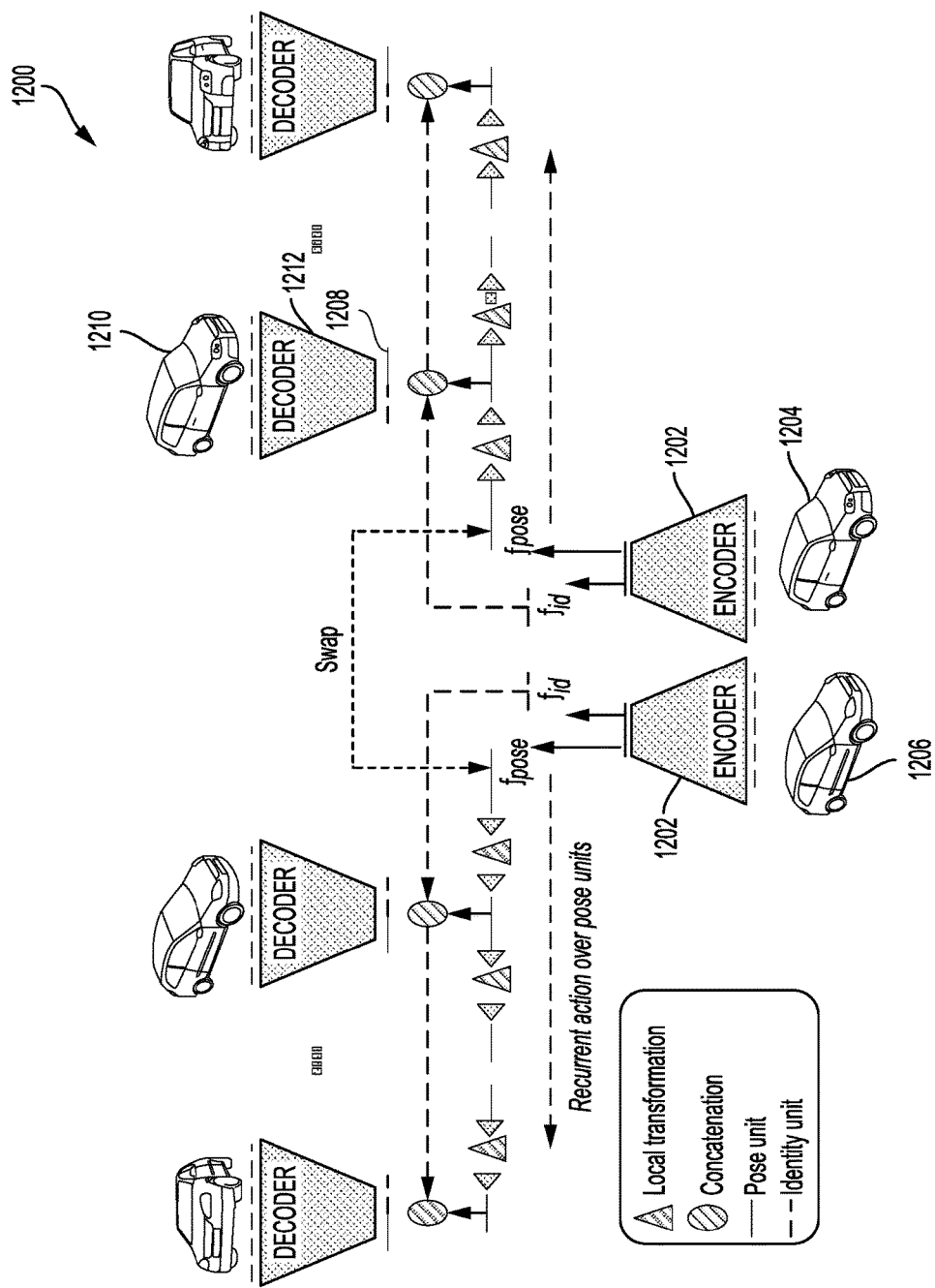
FIGS. 12A and 12B illustrate diagrams of object recognition systems in accordance with aspects of the present disclosure.

FIG. 12A illustrates an example of an orbit generator 1200 according to aspects of the present disclosure. In one configuration, the orbit generator includes two substantially-similar or identical (shared-parameter) branches of convolution and deconvolution operator stacks. In the example of FIG. 12A, the orbit generator is an encoder-decoder architecture (e.g., encoder-decoder artificial neural network).

In one configuration, each encoder 1202 accepts an input 1204, 1206, such as an image, and produces an abstract representation of the input. The activations of the last layer in the encoder are split, namely, into identity units and pose units. Identity units contain intrinsic identity information of the input, independent of the pose units. Pose units are isolated from the identity units and contain information that is relevant to the pose of the instance. As shown in FIG. 12A, the pose information from a first input 1204 is swapped with the pose information of a second input 1206. The second branch and the swap operation provide for the improved isolation of the pose information from the identity information.

Without the swap operation, the network is not constrained to learn isolated representations of pose and identity. The swap operation also provides for sharing the pose information across different object instances, which improves pose recognition and also improves the purity of identity information. As shown in FIG. 12A, after the swap, a series of matrix multiplications (recursions) are performed on the pose units until a desired number of steps are obtained in the pose parameter space. In the present configuration, the identity units are maintained. Recursion provides pose codes for consecutive frames of an out-of-plane rotation sequence with a predefined step. When a desired number of pose units are generated, each pose unit is concatenated with the identity to obtain an original representation dimensionality 1208. A decoder 1212 receives the original representation dimensionality 1208 and generates target images 1210 and binary object masks by a series of deconvolutions.

The object recognition system may be trained by showing two different object instances (e.g., identities) of a given class (e.g., cars) in the same pose. Rotated states (images) of the inputs are used as a training signal. The mean squared error (MSE) is minimized over all generated images and ground-truth pairs via a standard gradient descent optimizer, such as adaptive moment estimation (ADAM). As an extra regularizer, the network predicts binary masks for the objects and minimizes the mean squared error between the mask predictions and ground-truths over all generation steps.

Representations are inherently invariant to pose/identity. Aspects of the present disclosure provide for independent extraction of pose and identity. In one configuration, the objection recognition system generates new samples at both the representation level and the image level. Additionally, in one configuration, the object recognition system generates samples from the pose manifold and improves recognition.

Figure 12B:
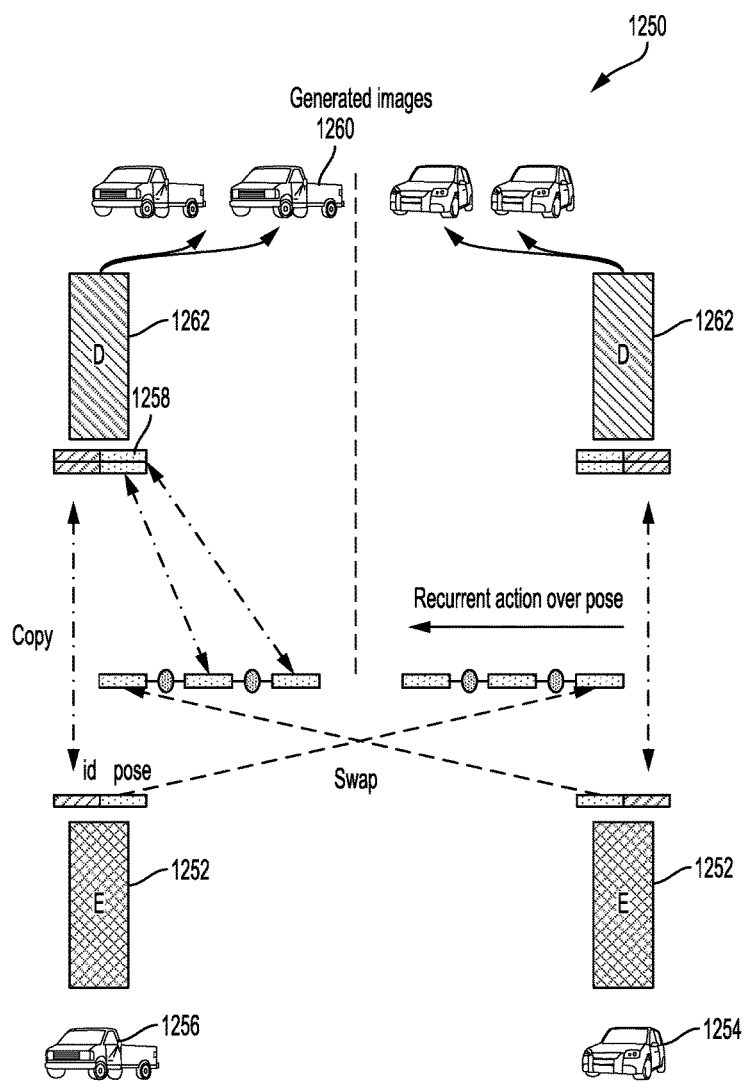

FIG. 12B illustrates another example of an orbit generator 1250 according to aspects of the present disclosure. In the example of FIG. 12B, the orbit generator is an encoder-decoder architecture (e.g., encoder-decoder artificial neural network). Each encoder 1252 may accept an input 1254, 1256, such as an image. The encoders 1252 generate an abstract representation of the input. The activations of the last layer in the encoder are split, namely, into identity units and pose units. Identity units contain intrinsic identity information of the input, independent of the pose units. Pose units are isolated from the identity units and contain information that is relevant to the pose of the instance. As shown in FIG. 12B, the pose information from a first input 1254 is swapped with the pose information of a second input 1256. The second branch and the swap operation provide for the improved isolation of the pose information from the identity information.

As shown in FIG. 12B, after the swap, a series of recurrent actions (e.g., matrix multiplications) are performed on the pose units until a desired number of steps are obtained in the pose parameter space. Recursion provides pose codes for consecutive frames of an out-of-plane rotation sequence with a predefined step. When a desired number of pose units are generated, each pose unit is concatenated with the identity to obtain an original representation dimensionality 1258. In the present configuration, the identity units are maintained and are input to a decoder 1262. The decoder 1262 receives the original representation dimensionality 1258 and generates target images 1260 and binary object masks by a series of deconvolutions.

In conventional systems, a feature may be invariant to all or most other features, causing a lack of distinction between similar instances. Fully invariant features may be unnecessary when the invariance of a feature does not occur. Furthermore, each separate feature may be completely invariant, still, the combination of features may be unnecessary when specific combinations do not jointly occur or always jointly occur.

For example, a conventional object recognition system may determine the eyes of an object as a feature. However, eyes are not distinct features of an object and searching for only the eyes would not distinguish the object of the query from other objects in a dataset. It is desirable to have features that are invariant and highlight a distinct condition of an object.

Geometry distortion under various views generates a very large variant group. Therefore, in one configuration, the pose of an object is used as a starting case. A close relationship between the combined feature set is created by generating all possible poses from the one example and verifying the candidate target image for one such pose.

In one configuration, an offline-learned orbit generator is used in identity recognition from a single visual shot. The orbit is the collection of all feature points of an object when submitted to a transform. In the present configuration, the transform refers to the transformation of the pose by considering different viewpoints of the object. In the feature space and subsequently in the image space, unseen poses are generated from one visual example with the aid of a network trained on similar objects. The unseen views are discretely sampled with an interval, such as 10 degree differences in view point.

During the learning phase, K1, . . . Ki object images of all poses are available. In one configuration, every Ki is represented by a predetermined number of poses, such as thirty poses. In the learning phase, the object recognition system learns a manifold Mj in the feature space varying with pose as the parameter and the structure of the manifold is shared across all instances of the same type j. Given a new instance N, the object recognition system predicts the orbit of the new instance N in a feature space while varying a pose parameter p. The orbit can be one-dimensional (1D) for a horizontal viewpoint change or 3D for any viewpoint change.

As previously discussed, in the separation of pose and identity information, aspects of the present disclosure enforce strong disentanglement by using a pose sharing network architecture to regularize the invariant representation. Aspects of the present disclosure are not limited to pose transform and are also applicable to other transforms.

The unique combination for one identity and one pose will follow from regenerating an image of the object with that identity and pose. Partial occlusions, shadows, inner reflections, and peculiarities follow from regenerated images for that identity and pose. Given one image of one instance N in an arbitrary pose and given an orbit generator, the object recognition system provides the full orbit $O_N$ of the one instance N including all other poses p.

In one configuration, given an object (e.g., query) and one or more candidate targets, the object recognition system may determine the different poses for the object and/or the one or more candidate targets to determine whether the object matches the one or more candidate targets. A similarity function may be used for determining whether the object matches the one or more candidate targets.

For example, M() is a similarity function for measuring the similarity between orbits and measuring the similarity between an orbit and an image. M() may have various forms, such as, $M(O_R, O_T)$, $M(O_R, T)$ or $M(R, O_T)$. $M(O_R, O_T)$ compares a reference image orbit R and a new image orbit T. $M(O_R, T)$ compares the new image T to the reference image orbit R. $M(R, O_T)$ compares the reference image R to the new image orbit T. The best match may be determined by maximizing M.

Figure 13A:
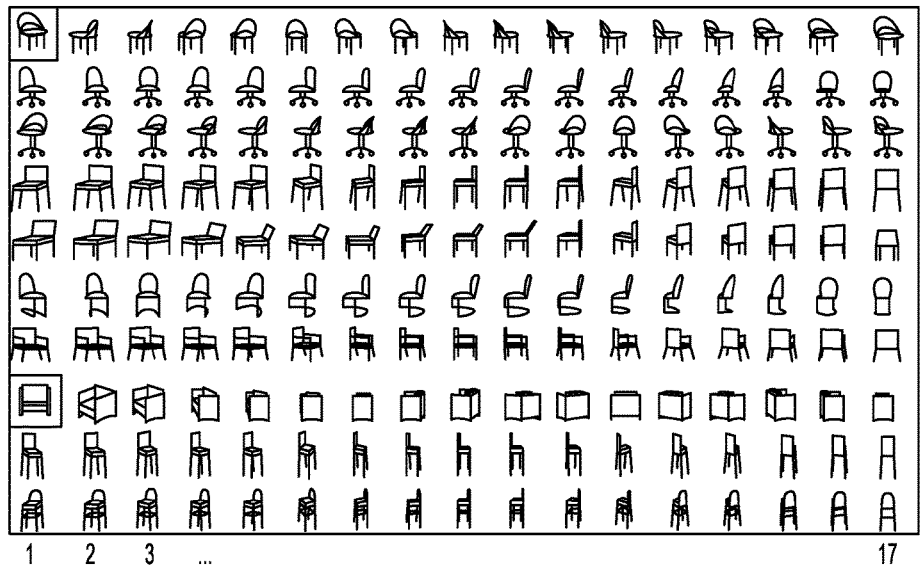
FIG. 13A illustrates an example of object rotation in accordance with aspects of the present disclosure.

FIG. 13A illustrates an example of generating different poses from a single instance of an object, according to aspects of the present disclosure. In FIG. 13A, the objects in column 1 are single instances of an object. In one configuration, upon receiving the input of the object from column 1, the object recognition system determines a pose and identity of the object. Columns 2-17 of FIG. 13A illustrate hallucinations of the different poses of the single instance of the object from column 1. That is, columns 2-17 are predictions of the different poses of the object.

The single image of the object from column 1 may not have been seen a priori. In one configuration, the object recognition system uses the orbit generator learned from different known poses of similar objects to generate the hallucinations in columns 2-17. That is, the object recognition system predicts different views of an object based on a single instance of the object. In the example of FIG. 13A, each column of columns 2-17 is an approximate 10 degree rotation from the previous column.

Figure 13B:
FIG. 13B illustrates an example of object recognition based on identity in accordance with aspects of the present disclosure.

FIG. 13B illustrates an example of object recognition according to aspects of the present disclosure. In one configuration, based on a single image of an object, such as a single image of an object in column 1 of FIG. 13B, the object recognition system identifies similar objects from any viewpoint (columns 2-17). In the example of FIG. 13B, the object recognition system only identifies the object and does not determine the object's pose.

Figure 14:
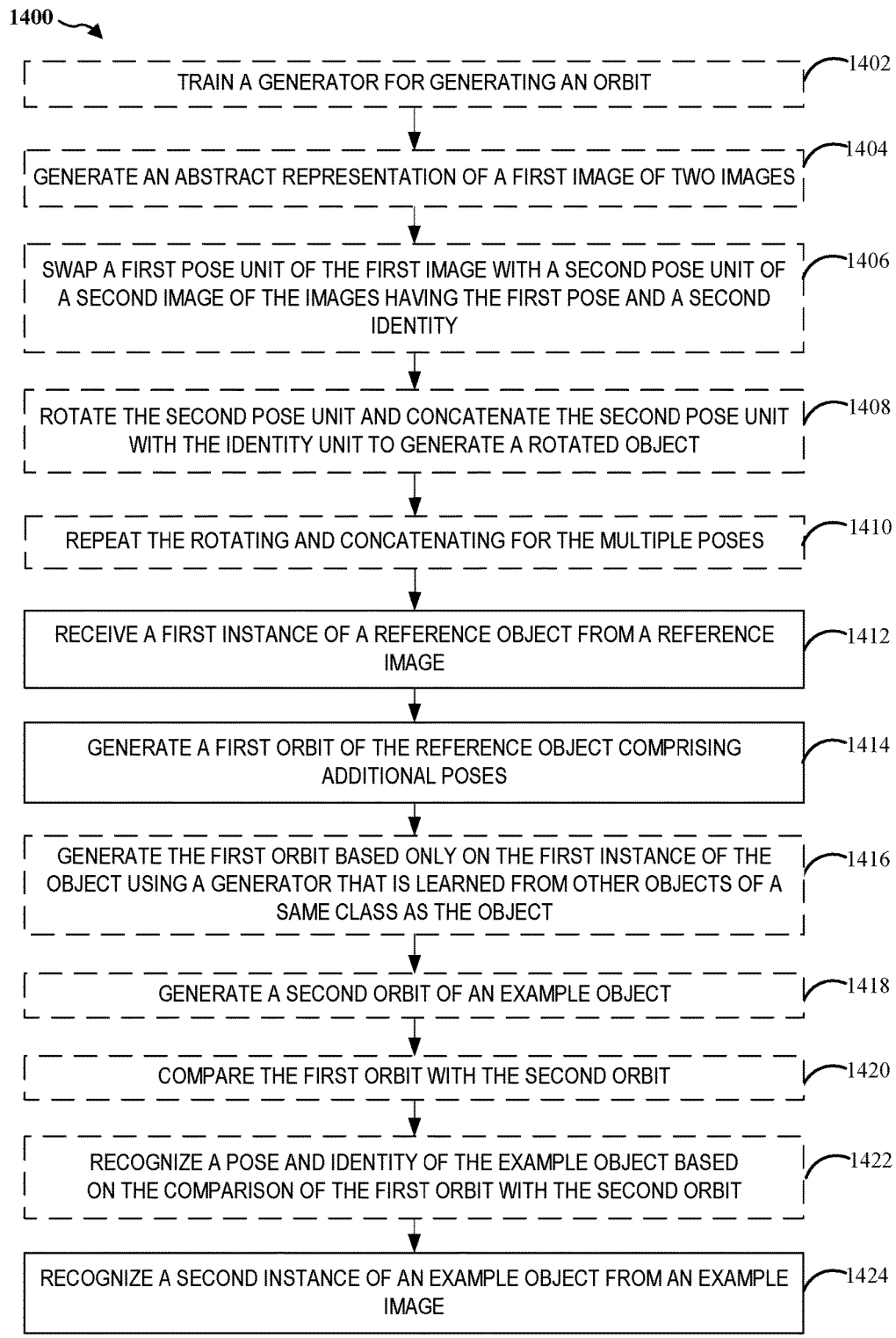
FIG. 14 illustrates a method for object recognition according to aspects of the present disclosure.

FIG. 14 illustrates a method 1400 for one-shot object recognition using an artificial neural network, according to an aspect of the present disclosure. In an optional configuration, at block 1402, the artificial neural network trains a generator for generating an orbit. In this configuration, the generator is trained using a two-branch encoder-decoder architecture that receives two images of two different objects in a same pose. In an optional configuration, at block 1404, the artificial neural network generates an abstract representation of a first image of the two images. The abstract representation includes a first pose unit and an identity unit. That is, the pose of the object is disentangled from the identity of the object.

To improve the disentanglement, in an optional configuration, at block 1406, the artificial neural network swaps the first pose unit of the first image with a second pose unit of a second image of the images having the first pose and a second identity. For example, the artificial neural network swaps the pose information of a first type of car with the pose information of a second type of car when both cars have the same pose (e.g., orientation).

In a further optional configuration, at block 1408, the artificial neural network rotates the second pose unit and concatenates the second pose unit with the identity unit to generate a rotated object (e.g., one pose of an orbit). The process continues until a full orbit is obtained. That is, in an optional configuration, at block 1410, the artificial neural network repeats the rotating and concatenating for the multiple poses. Each pose in the orbit may have a 10 degree difference from a previous pose.

After training the generator, at block 1412, the artificial neural network receives a first instance of a reference object from a reference image. The reference object includes a first identity and a first pose in the first instance. According to one aspect of the present disclosure, the pose refers to an orientation of the object. In one configuration, the first instance is received at an encoder layer of the artificial neural network.

At block 1414, upon receiving the first instance of the object, the artificial neural network generates a first orbit of the reference object comprising additional poses, such as a second pose for the reference object. In an optional configuration, at block 1416, the artificial neural network generates the first orbit based only on the first instance of the object using a generator that is learned from other objects of a same class as the object. For example, the artificial neural network receives an instance of a first car in a reference image. In this example, the artificial neural network has not previously seen the first car. The orbit is generated using the instance of the first car and additional poses obtained from similar cars that have been previously seen by the artificial neural network.

In an optional configuration, at block 1418, the artificial neural network generates a second orbit of an example object. The example object may be an object from an example image (e.g., test image) that is presented in a dataset for recognition. In another optional configuration, at block 1420, the artificial neural network compares the first orbit with the second orbit. For example, the orbits may be rotated in a direction to align two sets of points on the orbits and the two orbits may be compared (see FIG. 11). In yet another optional configuration, at block 1422 the artificial neural network recognizes a pose and identity of the example object based on the comparison of the first orbit with the second orbit. At block 1424, based on the comparison of the orbits, the artificial neural network recognizes a second instance of an example object from an example image. The second instance is recognized when the example object has the first identity and the second pose in the second instance.

In some aspects, method 1400 may be performed by the SOC 100 (FIG. 1) or the system 200 (FIG. 2). That is, each of the elements of method 1400 may, for example, but without limitation, be performed by the SOC 100 or the system 200 or one or more processors (e.g., CPU 102 and local processing unit 202) and/or other components included therein.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of one-shot joint instance and pose recognition in an artificial neural network, comprising:
training a generator for generating an orbit, the generator trained using a two-branch encoder-decoder architecture that receives two images of two different objects in a same pose;
receiving a first instance of a reference object from a reference image, the reference object having a first identity and a first pose in the first instance;
generating, via the trained generator, a first orbit of the reference object comprising a plurality of additional poses including a second pose for the reference object; and
recognizing a second instance of an example object from an example image, the example object having the first identity and the second pose in the second instance.

2. The method of claim 1, further comprising:
generating a second orbit of the example object; and
comparing the first orbit with the second orbit.

3. The method of claim 2, further comprising recognizing a pose and identity of the example object based on comparing of the first orbit with the second orbit.

4. The method of claim 1, further comprising:
generating the first orbit based only on the first instance of the object using a generator that is learned from other objects of a same class as the object; and
recognizing the second instance based on the first instance and the first orbit.

5. The method of claim 1, further comprising generating an abstract representation of a first image of the two images, the abstract representation comprising a first pose unit and an identity unit.

6. The method of claim 5, further comprising swapping the first pose unit of the first image with a second pose unit of a second image of the two images having the first pose and a second identity.

7. The method of claim 6, further comprising:
rotating the second pose unit;
concatenating the second pose unit with the identity unit to generate a rotated object; and
repeating the rotating and concatenating for a plurality of poses.

8. An artificial neural network for one-shot joint instance and pose recognition, the artificial neural network comprising:
a memory; and
at least one processor coupled to the memory, the at least one processor configured:
to train a generator for generating an orbit, the generator trained using a two-branch encoder-decoder architecture that receives two images of two different objects in a same pose;
to receive a first instance of a reference object from a reference image, the reference object having a first identity and a first pose in the first instance;
to generate, via the trained generator, a first orbit of the reference object comprising a plurality of additional poses including a second pose for the reference object; and
to recognize a second instance of an example object from an example image, the example object having the first identity and the second pose in the second instance.

9. The artificial neural network of claim 8, in which the at least one processor is further configured:
to generate a second orbit of the example object; and
to compare the first orbit with the second orbit.

10. The artificial neural network of claim 9, in which the at least one processor is further configured to recognize a pose and identity of the example object based on comparing of the first orbit with the second orbit.

11. The artificial neural network of claim 8, in which the at least one processor is further configured:
to generate the first orbit based only on the first instance of the object using a generator that is learned from other objects of a same class as the object; and
to recognize the second instance based on the first instance and the first orbit.

12. The artificial neural network of claim 8, in which the at least one processor is further configured to generate an abstract representation of a first image of the two images, the abstract representation comprising a first pose unit and an identity unit.

13. The artificial neural network of claim 12, in which the at least one processor is further configured to swap the first pose unit of the first image with a second pose unit of a second image of the two images having the first pose and a second identity.

14. The artificial neural network of claim 13, in which the at least one processor is further configured:
to rotate the second pose unit;
to concatenate the second pose unit with the identity unit to generate a rotated object; and
to repeat rotation and concatenation for a plurality of poses.

15. A non-transitory computer-readable medium having program code recorded thereon for one-shot joint instance and pose recognition in an artificial neural network, the program code executed by a processor and comprising:
program code to train a generator for generating an orbit, the generator trained using a two-branch encoder-decoder architecture that receives two images of two different objects in a same pose;
program code to receive a first instance of a reference object from a reference image, the reference object having a first identity and a first pose in the first instance;
program code to generate, via the trained generator, a first orbit of the reference object comprising a plurality of additional poses including a second pose for the reference object; and
program code to recognize a second instance of an example object from an example image, the example object having the first identity and the second pose in the second instance.

16. The non-transitory computer-readable medium of claim 15, in which the program code further comprises:
program code to generate a second orbit of the example object; and program code to compare the first orbit with the second orbit.

17. The non-transitory computer-readable medium of claim 16, further comprising program code to recognize a pose and identity of the example object based on comparing of the first orbit with the second orbit.

18. The non-transitory computer-readable medium of claim 15, further comprising:
program code to generate the first orbit based only on the first instance of the object using a generator that is learned from other objects of a same class as the object; and
program code to recognize the second instance based on the first instance and the first orbit.

19. The non-transitory computer-readable medium of claim 15, further comprising program code to generate an abstract representation of a first image of the two images, the abstract representation comprising a first pose unit and an identity unit.

20. The non-transitory computer-readable medium of claim 19, further comprising program code to swap the first pose unit of the first image with a second pose unit of a second image of the two images having the first pose and a second identity.

21. The non-transitory computer-readable medium of claim 20, further comprising:
program code to rotate the second pose unit;
program code to concatenate the second pose unit with the identity unit to generate a rotated object; and
program code to repeat rotation and concatenation for a plurality of poses.

22. An apparatus for one-shot joint instance and pose recognition in an artificial neural network, comprising:

means for receiving a first instance of a reference object from a reference image, the reference object having a first identity and a first pose in the first instance;
means for generating a first orbit of the reference object comprising a plurality of additional poses including a second pose for the reference object;
means for recognizing a second instance of an example object from an example image, the example object having the first identity and the second pose in the second instance; and
means for training the means for generating via a two-branch encoder-decoder architecture that receives two images of two different objects in a same pose.

23. The apparatus of claim 22, further comprising:
means for generating a second orbit of the example object; and
means for comparing the first orbit with the second orbit.

24. The apparatus of claim 23, further comprising means for recognizing a pose and identity of the example object based on comparing of the first orbit with the second orbit.

25. The apparatus of claim 22, further comprising:
means for generating the first orbit based only on the first instance of the object using a generator that is learned from other objects of a same class as the object; and
means for recognizing the second instance based on the first instance and the first orbit.

26. The apparatus of claim 22, further comprising means for generating an abstract representation of a first image of the two images, the abstract representation comprising a first pose unit and an identity unit.

* * * * *